W. J. P. MOORE.
DEMOUNTABLE RIM.
APPLICATION FILED MAR. 1, 1918.

1,362,340.

Patented Dec. 14, 1920.
7 SHEETS—SHEET 3.

INVENTOR
William J. P. Moore
BY
Fred A. Tasker
ATTORNEY

W. J. P. MOORE.
DEMOUNTABLE RIM.
APPLICATION FILED MAR. 1, 1918.

1,362,340.

Patented Dec. 14, 1920.
7 SHEETS—SHEET 4.

INVENTOR
William J. P. Moore
BY
Fred A. Tasker
ATTORNEY

W. J. P. MOORE.
DEMOUNTABLE RIM.
APPLICATION FILED MAR. 1, 1918.

1,362,340.

Patented Dec. 14, 1920.
7 SHEETS—SHEET 5.

W. J. P. MOORE.
DEMOUNTABLE RIM.
APPLICATION FILED MAR. 1, 1918.

1,362,340.

Patented Dec. 14, 1920.
7 SHEETS—SHEET 7.

Inventor
William J. P. Moore,
By his Attorney
Fred R. Tasker.

UNITED STATES PATENT OFFICE.

WILLIAM J. P. MOORE, OF NEW YORK, N. Y.

DEMOUNTABLE RIM.

1,362,346.   Specification of Letters Patent.   Patented Dec. 14, 1920.

Application filed March 1, 1918. Serial No. 219,788.

*To all whom it may concern:*

Be it known that I, WILLIAM J. P. MOORE, a citizen of the United States, and resident of New York, in the county of New York and State of New York, have invented certain new and useful Improvements in Demountable Rims, of which the following is a specification, reference being had therein to the accompanying drawings.

My invention relates to certain new and useful improvements in demountable rims for wheels of various kinds, the object being to enable the rim to be removed from the wheel and reapplied thereto with a minimum of labor and effort. With this invention it is only necessary to slightly rotate one single bolt, without the removal of any nuts. To this end I simplify the means of holding the removable rim in place, so that said means can be quickly and easily operated whenever a puncture of the tire or any other contingency requires that the tire should be removed and a fresh one substituted in place thereof. The invention comprises essentially an expansible and contractible ring whose free ends are brought together or apart by a very simple mechanism requiring the handling of only a single bolt or its equivalent, the working of which can be performed in a few seconds with but a single tool and with little effort. The invention, therefore, may be said to consist essentially in the construction, arrangement and combination of the various parts, substantially as will be hereinafter described and then more fully pointed out in the ensuing clauses of claims.

In the accompanying drawings illustrating my invention.

Similar characters of reference designate corresponding parts throughout the different figures of the drawings.

Figure 2:
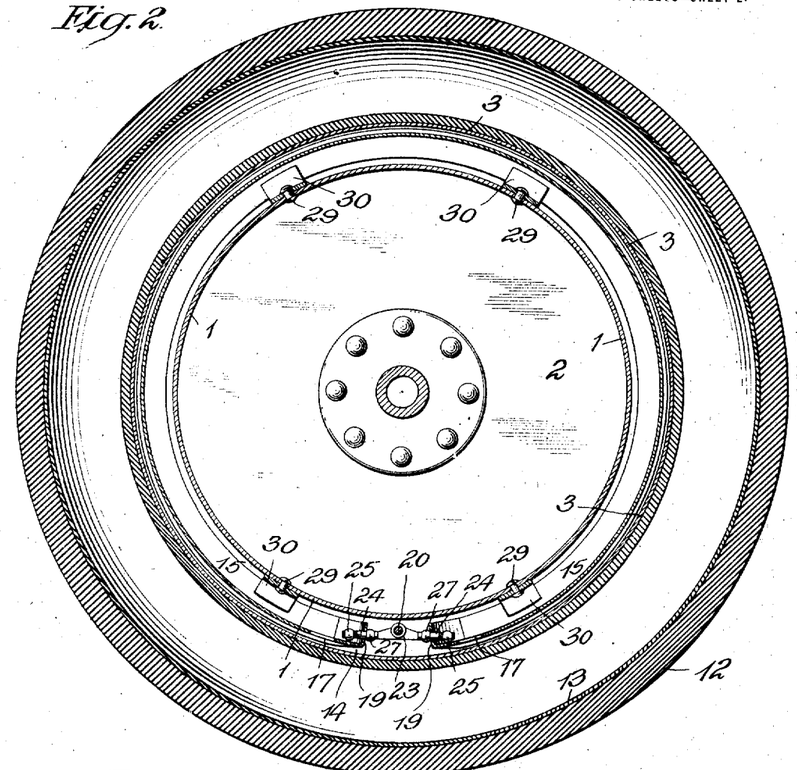
Fig. 2 is a longitudinal section of the entire wheel, rim and tire.

My invention may be applied to a great variety of wheels of automobiles and the like, and I do not wish to be restricted to any particular kind of wheel. One kind, however, which may be given by way of illustration, is the wheel of the disk type, as shown in Fig. 2 where there is a pair of annular disks 2, 2 attached centrally to the hub and on their outer edges to the fixed rim 1. The fixed rim 1 is encircled by a demountable or removable rim 3, having on one edge of the flange 4, while the opposite edge has the flange 37 which engages the detachable ring 5. This outer removable rim 3 carries the usual pneumatic tire consisting, for example, of an outer shoe 12 and an inner tube 13, which are shown in the drawings merely by way of illustration, inasmuch as the tire forms no part of the present invention.

The removable rim 3 is shaped on its inner surface with a pair of similarly beveled sections, as 8 and 6, the beveled section 8 being opposite to the beveled portion of the detachable ring 5, while the beveled section 6 is formed by so shaping the material of the rim as to leave in the tire receiving recess a depression 7. (See Fig. 1). In this way the inner surface of the rim 3 provides irregularly-inclined corner beads or bearings on continuous circumferential lines against which some of the other features of the invention may be caused to bear in a manner to be hereinafter more fully explained.

Figure 1:
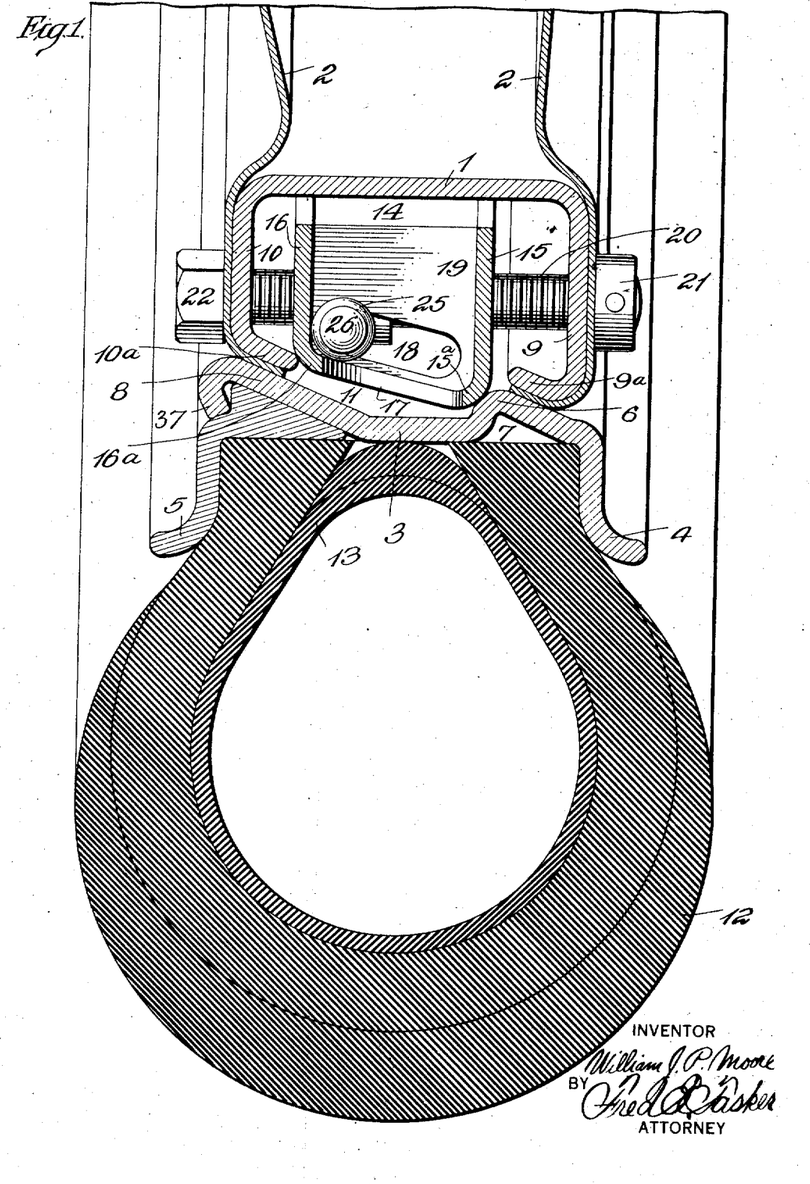
Figure 1 is a cross-section of my improved demountable rim.

The fixed rim 1 is of a box-like or channel form as shown in Fig. 1, the same having a side 9 with an inturned inclined member on its outer edge to form the flange 9ª, and an opposite side 10 whose outer edge is likewise turned inwardly and inclined to form the flange 10ª. The flanges 9ª and 10ª are similarly inclined, and the side 9 is preferably of greater depth than the side 10, so that the flange 9ª will be farther from the inner portion of the rim 1 than is the flange 10ª, these arrangements being necessary in order to disassemble the parts. All this is clearly shown in Fig. 1; and there is between the flanges 9ª and 10ª an intervening space 11. In the form of wheel which I am now describing the disks 2 may be secured by welding or otherwise to the ring 1, the outer edges of said disks being preferably secured to and covering the outside faces of the sides 9 and 10 and the flanges 9ª and 10ª. Of course, the size and shape of the fixed rim 1 and its constituent parts may vary within wide limits. What I have shown is given merely by way of explanation and not with the intention of confining myself thereto.

Figure 3:
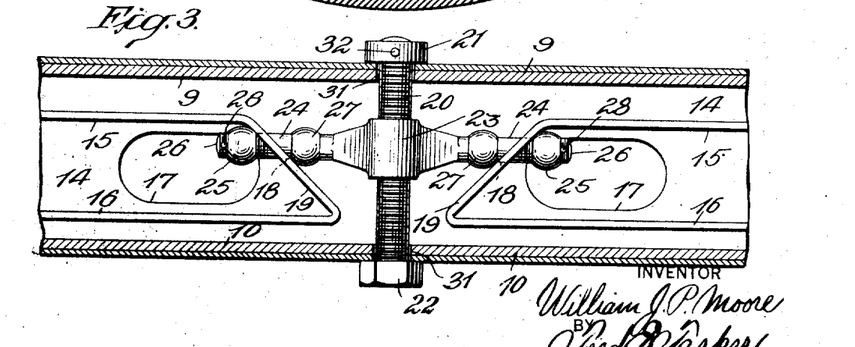
Fig. 3 is a detail section in partial plan of the adjoining ends of the expansible ring, together with the mechanism for operating said ends, the latter being in the position which it assumes when the ends have been drawn together and the ring placed in its collapsed position.
Figure 6:
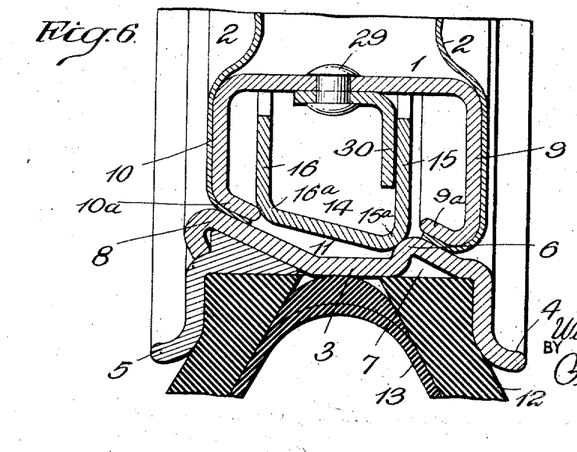
Fig. 6 is a cross-section of my improved demountable rim at a different point from the cross-section of Fig. 1, and on a different scale, and shows the angular guide clips for maintaining the position of the expansible ring.

Located inside of the hollow interior of the rim 1 and concentric with said rim is an expansible ring 14, having a U-shaped cross-section or some other similar shape, so that it will be in a channel form and with the sides 15 and 16, between which the inner edge of this ring is open. Projecting into said open side between the sides 15 and 16 is a series of stationary angular pieces 30 that are secured by rivets 29 to the fixed rim 1 or otherwise secured thereto, and which have the function of preventing the ring 14 from being laterally moved out of place. (See Figs. 2 and 6). The outer portions of the sides 15 and 16 are bent over at 15ª and 16ª respectively to form rounding or beveled corners for the ring 14. It will be noted that the side 15 is deeper than the side 16. Also, in order to make the structure lighter and more economical, I provide the outer inclined member of ring 14 with openings 17. (See Figs. 1 and 3). The ring 14 is split at one point and the ends 19 are oppositely inclined as shown in Fig. 3. Said inclined ends are provided preferably with slots 18, which are inclined to the longitudinal plane of the wheel, or to the axis of the operating bolt 20. (See Fig. 1). These slots 18 are designed to receive members of a clamp device by means of which the ends 19 are drawn together or forced apart.

Figure 4:
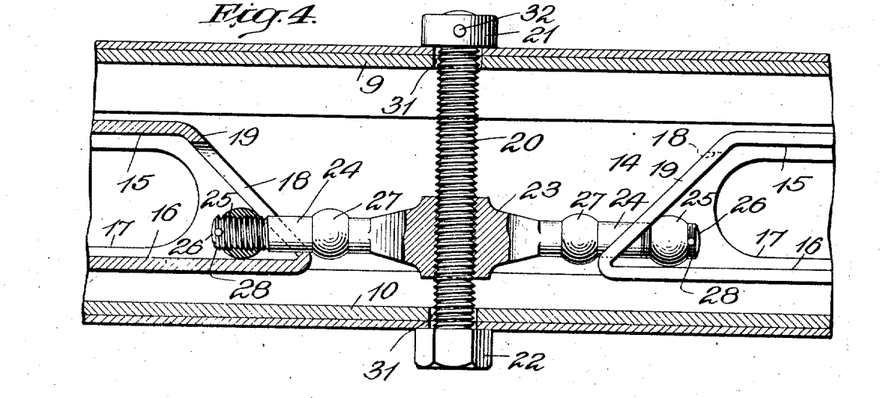
Fig. 4 is a similar detail sectional view of the same parts, but on a different scale, and also different in the planes of some of the sectional cuts, and showing the means for drawing together or spreading apart the free ends of the expansible ring in the position which said means takes when the said ends are forced apart and the ring is expanded in its clamping position.
Figure 5:
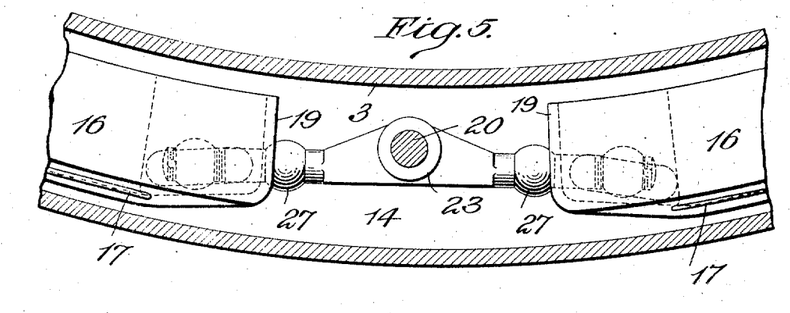
Fig. 5 is a sectional side view of the same parts represented in Figs. 3 and 4.

The means for manipulating the contiguous ends of the split ring 14 are clearly shown in Figs. 3, 4, and 5. Proceeding to describe the form of the same here shown 20 denotes a transverse screw-threaded bolt which passes through suitable perforations 31, in the sides 9 and 10 of the fixed rim 1, and also in the overlapping portions of the disks 2, said bolt 20 being positioned between the free beveled ends 19 of ring 14, as shown in Figs. 3 and 4. On one end of the bolt 20 outside the rim 1 is a ring or collar 21 held by a pin 32, while the other end of this bolt on the other side of the rim 1 has a bolt-head 22. The bolt 20 is screw-threaded from end to end. Traveling thereon is a nut 23 having oppositely projecting arms 24, 24 which extend into and through the slots 18 in the ends 19 of the channeled ring 14. These arms 24, 24 are provided with shoulders or swelled portions 27 that are in contact with the outer beveled faces of the ends 19. The extreme ends 26 of the arms 24 are screw-threaded and provided with balls or blocks 25 that screw thereon and are adjustable in position, being held in any desired position by the pins 28, said balls 25 being on the inside of the inclined ends 19. It will thus be manifest that as the bolt 20 is rotated in one direction or the other by applying a wrench or other tool to the bolt-head 22, the nut 23 will be caused to travel in one direction or the other, and this will cause the arms 24 to act upon the ends of ring 14, the balls 25 and 27 sliding against the inclined faces of the ends 19, so that if the nut 23 travels in one direction, the effect will be to draw the ends 19 toward each other, because the balls 25 and 27 will slide on the inclined faces of members 19 and draw said members toward each other, as shown in Fig. 3, where the nut has reached the limit of its travel in one direction and collapsed ring 14 and brought the ends 19 as close together as it is possible to bring them by this means. If we now assume that the nut 23 is caused to travel in the opposite direction, that is to say from the position shown in Fig. 3 to the position shown in Fig. 4, the result will be that the ends 19 will be forced apart because of the traveling of the balls 25 and 27 on the inclined faces of members 19 in the opposite direction from that which they were traveling before; or in other words the ring 14, being a split ring of resilient material will, when the nut 23 is traveling in one direction, be expanded so as to lock the parts together, and when the ring is traveling in the opposite direction the clamping effect will be overcome and the parts released from each other so that the rim 3 can be readily demounted.

When the ring 14 is tightened by the rotation of the bolt 20 in the proper direction one rounded corner 16ª will bear firmly against the flange 10ª of the fixed rim 1, while the other rounded corner 15ª will bear firmly against the bead 6 of the removable rim 3, which will strongly clamp together the fixed rim 1, expansible ring 14 and the removable rim 3, so that the latter rim which carries the tire will be locked securely upon the body of the wheel for the continuous circumference of the wheel. When it is desired to release the rim so as to take it off the wheel and put another rim in its place, all that the user needs to do is to rotate the bolt 20 in the proper direction to cause the nut 23 to so travel that it will permit the ends 19 of the split ring to move toward each other and thus release said ring from any clamping action upon the removable rim, or in other words, by unlocking the several parts above mentioned so that the rim 3 can be quickly and easily demounted.

It it to be further noted that the inclined slots 18, through which the arms 24 of the nut 23 pass, lie at angles to the axis of the bolt 20. Hence, while the arms 24 and their balls or swellings 25 and 27 are acting upon the inclined ends 19 to draw said ends together or apart, the movement of the arms 24 in the inclined slots 18 will have the further effect of expanding the ends of ring 14 radially and thus binding the ring 14 more firmly in place, or the reverse effect of causing an inward radial movement of the ends of ring 14 which will assist in releasing the clamping action of ring 14. I wish to say however that these slots 18 may be varied within wide limits. If desired, and they are made of the proper width and size, they may be cut straight across and not on an angle. Further, if cut on the proper angle, it may be unnecessary to have balls or shoulders on the nut arms, and such balls may be omitted. Also, a cam movement may be substituted in place of the means shown, or various other devices can be utilized.

Figure 7:
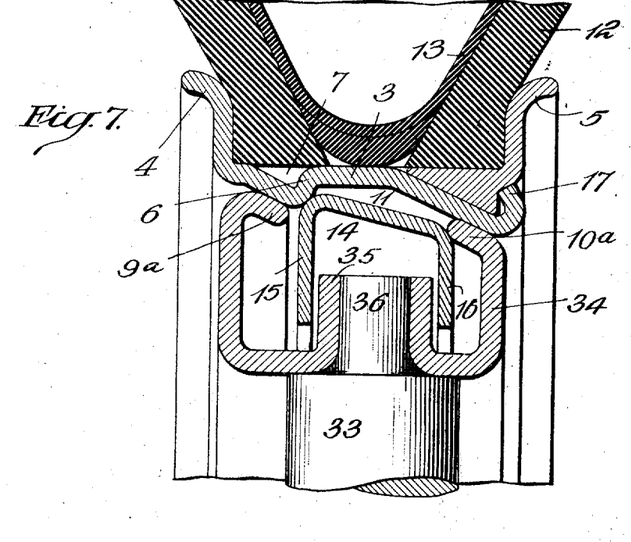
Fig. 7 is another cross-section of my improved demountable rim, showing a modification for applying the invention to a wooden wheel whose spokes are attached to a suitable metallic fixed rim or felly band.
Figure 8:
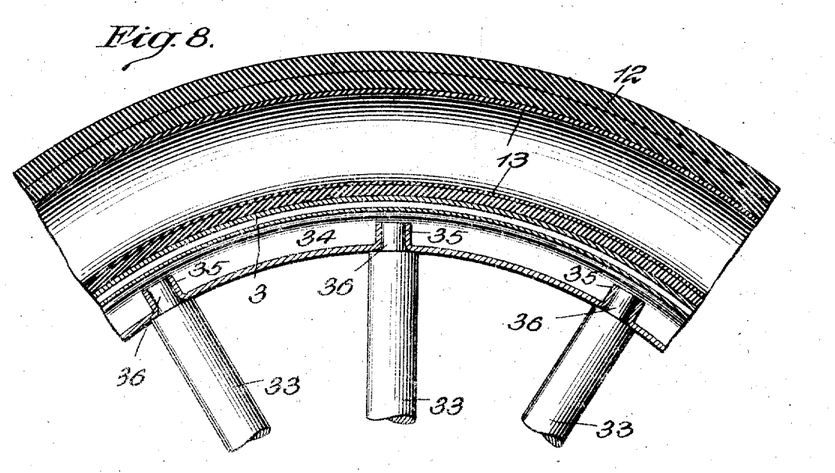
Fig. 8 is a detailed longitudinal section of the invention as shown in the modification like the form indicated in Fig. 7.

In Figs. 7 and 8 I have shown the invention applied for use with a wheel having wooden spokes, as 33, which are secured to the steel fixed rim or a felly band 34. Said rim 34 is similar to the boxlike or channeled rim 1 of the other figures of the drawing, except that it is provided at intervals with inwardly projecting sockets 35 which receive the tenons 36 of the spokes 33. The other parts of this modification of the invention are arranged to operate substantially the same way as before, it being noted that there is the same expansible ring 14 which functions the same way in its action with the outer removable rim 3. The sockets 35 extend into the interior of the ring 14 and lie between the sides 15 and 16 of said ring, keeping the ring 14 from any lateral displacement while being expanded or contracted. Many changes may be made in the precise details of my invention without exceeding the scope thereof, and I therefore reserve the liberty of changing the embodiment as may be found necessary.

Referring next to Figs. 9 to 15, I have represented therein another form of the invention which in many respects is the simplest of them all and is designed for universal application and to be operated with perfect ease and efficiency. In this form the fixed rim 40 is encircled by a demountable or removable rim 41, having the side flanges 42. Said removable rim 41 carries the usual pneumatic tire consisting, for example, as in the other figures of the drawings, of an outer shoe 12 and an inner tube 13, although these are indicated merely by way of illustration. The removable rim 41 is shaped on its inner surface with a suitable inclined beveled or curved face, one or more of them, in order that said rim may be slipped easily over the fixed rim 40. In the specimen of the invention shown in the drawings, this removable rim 41 has on its inner surface a pair of beveled sections or faces, as 43 and 44, together with a rib or flange 45 located not far distant from the face 43, said faces 43 and 44 being preferably on lines of different radii so that they will be at different distances from the center of the wheel and thus will jointly assist in providing an inclined surface for the inside of the removable rim, but of course, I do not wish to be confined thereto but reserve the liberty of changing the number of faces and otherwise varying same within wide limits.

Figures 14, 15:
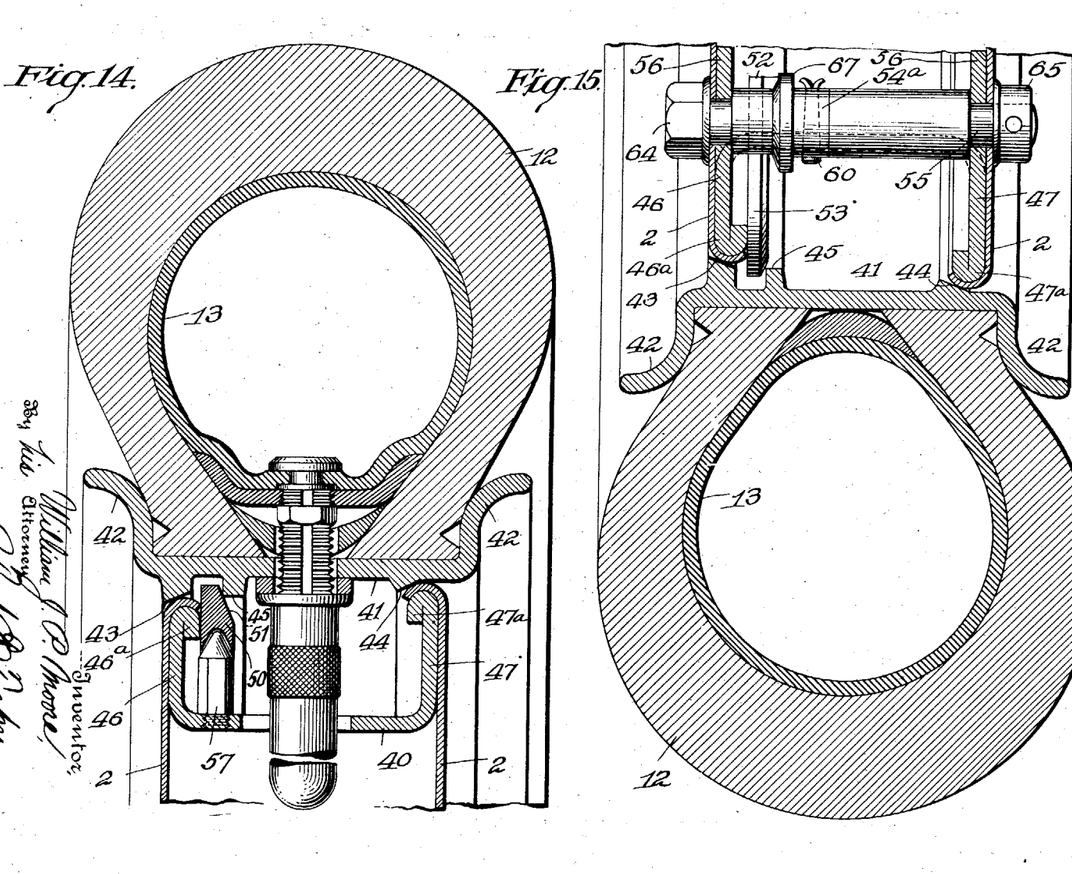
Fig. 14 is a transverse section of the rim at a point adjacent to the air filling valve.
Fig. 15 is a similar transverse section and shows the locking cam and its bolt in side view.

The fixed rim 40 is preferably of a boxlike or channel form as in the other figures of the drawings, and has an inner member with a pair of integral parallel sides 46 and 47, one of which 47 is deeper than the other, and the edges of these parallel sides 46 and 47 being preferably inturned or overlapped at 46ª and 47ª, and further when the wheel is of the disk type, as previously explained, the pair of annular disks 2 will overlap the inner edges of the sides 46ª and 47ª, as shown in Figs. 14 and 15, because in this manner a satisfactory and efficient welding of the parts is permitted, and the result is a very secure union of the disks 2 with the fixed rim. Of course, the size, shape and precise relation of these various parts may change and be modified in many ways and in different forms. When the particular form is adopted which I have described and shown in Figs. 9 to 15, the removable rim, when mounted on the fixed rim, will have its incline 44 resting on the edge of the disk 2 which is secured to the inturned edge 47ª, while the inclined face 43 rests upon the part of the disk 2 which is welded to the inturned edge 46ª, and the inclines 43 and 44 will rise slightly on these members when the outward and lateral strain of the expansible ring 50 is applied thereto.

The expansible ring 50 is however the most important feature of this modified or alternate form of the invention, and this is shown in cross-section in Fig. 14 and in side view and partly in section in various figures, say, from 9 to 15. It is located loosely inside of the hollow interior of the fixed rim 40, and concentric therewith and with the surrounding removable rim 41, and is preferably in contact with one of the sides, as 46, of said box-like fixed rim 40, and also it is in contact with some portion of the inner face of the demountable rim 41, as for example, the inner circumferential bead or rib 45. In order to enable the expansible ring 50 to bind and wedge against the removable rim and press same firmly and effectively laterally upon the fixed rim, I find it desirable to provide one side of said expansible ring 50 with an inclined face 51, so that as the ring 50 is expanded this inclined face 51 may be caused to ride on the edge of rib 45, and the effect will be that the rim 41 will be moved laterally and the faces 43 and 44 caused to mount upon the adjacent edges of the fixed rim, so that all the parts will be effectively interlocked.

Figures 9, 10:
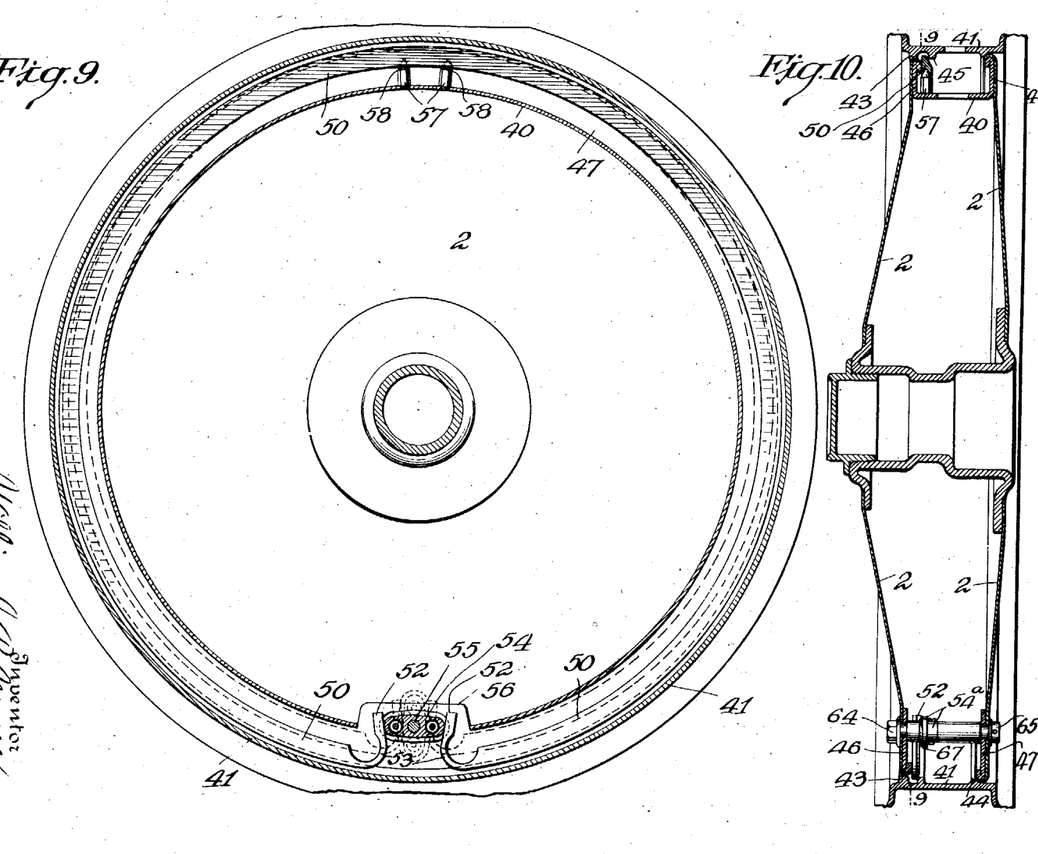
Fig. 9 is a sectional side elevation of an alternative form of the invention on the line 9, 9 of Fig. 10.
Fig. 10 is a transverse sectional view of the same.
Figure 11:
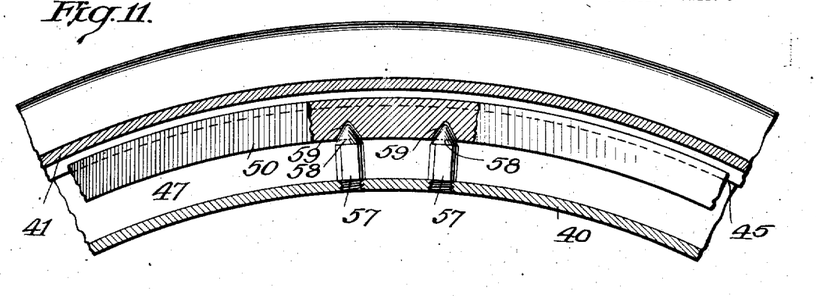
Fig. 11 is an enlarged sectional detailed view, showing more particularly the dowel devices for holding the expansible ring in position.
Figure 12:
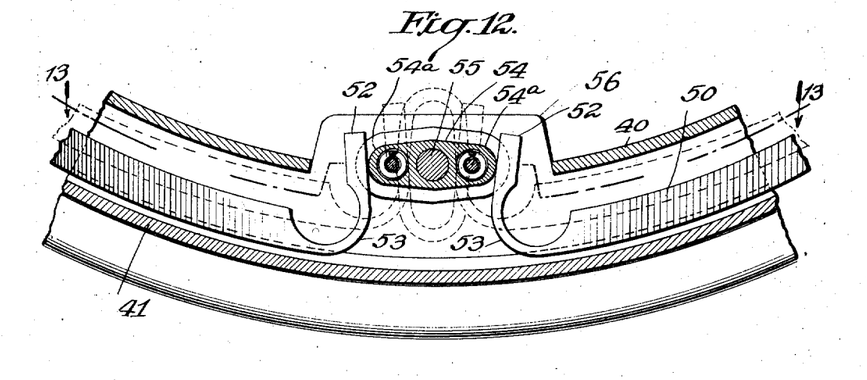
Fig. 12 is an enlarged detailed sectional view showing more particularly the elastic or expansible ring and the locking cam therefor.
Figure 13:
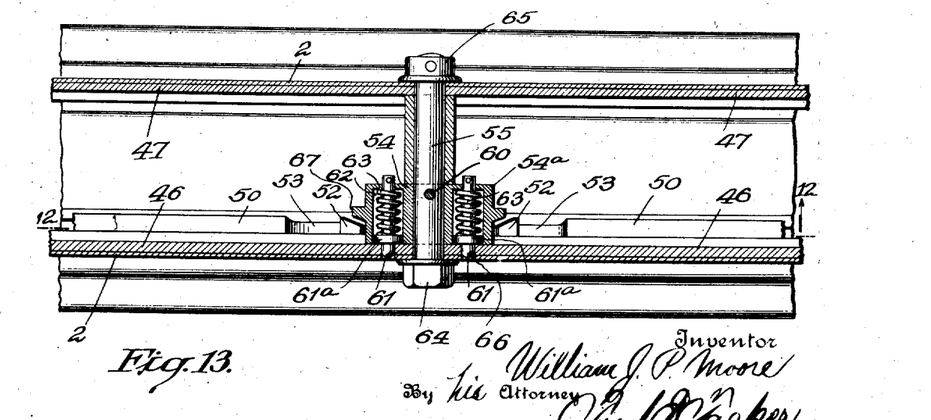
Fig. 13 is a longitudinal sectional view on the line 13, 13 of Fig. 12.

Said expansible ring 50 is divided or split at one point so as to leave two contiguous bent ends 52 which are separated more or less from each other, and between said ends 52 and the main portion of the ring 50 are curved integral connections 53, said connections being thinner and smaller than the main body of the ring and the ends 52 so that they will have more elasticity or flexibility. Consequently, it is possible to interpose between the ends 52 a rotatable member, such as a cam, which will force the ends 52 apart, and in so doing, will bend the connections 53; at the same time expanding the ring 50 outwardly and causing it to bind firmly against the rib 45 on the inner surface of the removable rim, as stated above. One example of expansion device for the separation of the ends 52 is shown in Figs. 9, 12, and 13, and consists of a cam 54 mounted on a bolt 55 which is carried in the side walls 46 and 47, of the fixed rim 40, or rather in the cut-out inturned parallel sections 56 of said side walls as shown in Figs. 9 and 12. Bolt 55 has a head 64 to which a tool may be applied for turning it, and on its other end is a collar 65 secured by a pin or other means. Of course the bolt and cam may be made in one piece if desired, that is to say the bolt may be made with cam projections or arms thereon that will do the work of the particular cam shown.

The cam 54 is secured by pin 60 to the bolt 55 and has two arms or high parts 54ª that are opposite to each other and that are adapted to bear against the ends 52 of the expansible ring 50 during the locking operation and thus expand the ring 50 so that it will clamp tightly against the outer demountable rim 41, all as clearly shown in Figs. 9, 12, and 14. In Figs. 9 and 12 the position of the cam 54 and its arms 54ª when unlocked is shown in dotted lines, at which time the cam may be said in a general way to lie parallel with and between the bent ends 52, or in a direction radial of the wheel; and when the cam is locked against these ends 52 of the expansible rim, with the parts 54ª of the cam bearing against said ends 52, the cam is shown in full lines in these Figs. 9 and 12. It will be seen that with the parts proportioned as shown a very slight rotation of the bolt 55 and the cam 54, in the present example of, say, a quarter of a turn, to the right or to the left, will be sufficient to expand the ring 50 by opening it outwardly from its neutral position to its locking position where it will tightly bear circumferentially around the inside of the demountable rim and will thus hold the latter securely upon the wheel.

When the cam 54 has thus been placed in its locking position with its arms 54ª bearing against the ends 52 of the ring 50 as shown in full lines in Figs. 9 and 12, any jarring of the parts thereof or of the internal parts of the rim during the running of the wheel might dislocate the cam from its locking position and destroy its clamping effect; and therefore, in order to avoid this, I find it desirable to use a detent or lock for holding said cam in its locking position. Various devices may be employed for this purpose. One form of the same I have shown in the drawings. It consists of a shouldered pin 61, or a pair of pins, inserted in parallel recesses 62 in the arms 54ª of cam 54 on opposite sides of the bolt 55 (see Fig. 13). These pins 61 are enveloped by springs 63 which are tensioned between collars or shoulders 61ª on the pins 61 and the opposite ends of the recesses 62, said collars 61ª fitting within circular recesses 62 and sliding therein, and there being projecting ends of the pins 61 beyond the collars 61ª which are adapted to enter perforations 66 in the wall 46 of the fixed rim 40 and the overlapping portions of the wheel disks 2, this engagement of the pin or pins 61 normally taking place under the forcing action of the springs 63. When the cam 54 occupies its locking position, therefore, the cam is kept in place by means of said pins, and prevented from being disturbed as a result of the motion of the wheel. When it is desired to unlock the cam, and collapse the expansible ring 50, all that the user needs to do is to first push the pins 61 inwardly so as to disengage them from the perforations 66 in the wall 46 and thus set free the cam, after which a wrench or other tool can be applied to the head 64 of bolt 55, and the latter given a slight movement sufficient to release the cam from the ends 52 of the ring 50. A great variety of tools may be used for the purpose of disengaging the detent or detents 61, and obviously a tool might be contrived which would disengage said detent or detents and hold them disengaged while simultaneously rotating bolt 54, but as said tool forms no part of the present invention, I do not think it necessary to illustrate or describe the same, inasmuch as a large variety of tools might be used for the purpose.

In order to keep the ring 50 in position while it is being expanded and prevent it from slipping out of place laterally or creeping circumferentially, I find it desirable and important to employ a relatively stationary member which can engage the same at a point opposite to the split or divided point, and as one example of means of this kind, I employ one or more dowel pins 57 which are screwed into the fixed rim 40 (see Fig. 11), occupying positions substantially radial of the wheel, and said dowels 57 having conical or pointed ends 58 which loosely engage corresponding-shaped notches 59 in the expansible ring 50. By causing these dowels or pins 57 to thus engage the ring 50 the latter is held in position while the cam device is operating upon the flexible ends at the point where the ring is divided. These dowels 57, as will be seen, also have the advantage of keeping the ring 50 in place when collapsed and prevent it from dropping out of position. It will be further seen that the cam 54 is provided with an encircling flange 67, one side of which is preferably beveled. Said flange has the function of holding the ring 50 in place when it is loose and prevents it from dropping down toward the other side of the fixed rim. The size and shape of the flange 67 may vary, but it will be found to be a useful adjunct.

An important consideration in connection with the locking ring 50 is that its yielding resilient ends enable any slack which may occur any time to be compensated for and taken up so that the clamping effect of the ring is never impaired. This ring 50 when it is made is bent to a slightly smaller diameter than its collapsed diameter, hence, when it is collapsed, it will be noted that the ends 52 follow back with the cam, keeping in contact therewith more or less closely even when the cam is in its neutral position, as shown in dotted lines in Figs. 9 and 12. The fact that the connections 53 are resilient or spring-like so as to give the ends resiliency, and the further fact that the ring is formed so that it will react to a position slightly smaller than its collapsed diameter, enables this advantage to accrue in the use of the wheel. It may happen that by striking against a curb or other obstruction, the demountable rim will be forced upon the fixed rim with such pressure at one or more points as to loosen the ring 50 or cause a certain amount of slack therein, and this would result in loosening all the parts were it not for the fact of these spring-like curved ends against which the cam is bearing, but the resiliency of these ends takes up any slack which may, in this manner, have been occasioned between the ring 50 and the rib 45, and enables the expansible ring to continue its locking effect permanently and continuously. This is a great advantage and makes the wheel more capable of hard usage than is the case with other forms of wheels now in use.

Having thus described my invention, what I claim as new and desire to secure by Letters Patent is:—

1. In a demountable rim, the combination with the fixed rim, of a removable rim, an expansible divided ring located between the rims, and having contiguous yielding resilient ends, and means between said ends for causing the ring to expand.

2. The combination of a fixed vehicle wheel rim of channel form, a removable rim adapted to be applied to the wheel laterally and to rest upon the edges of the sides of the channel-like fixed rim, an expansible divided locking ring arranged in the channel of the fixed rim and bearing against one of the sides thereof, and bearing also against the removable rim, one of the bearing faces of the locking ring being inclined, whereby it operates, when expanded, with a wedging action to force the removable rim laterally to its seat on the fixed rim, and means for expanding the locking ring consisting of a single transverse rotating member which causes a separation of the ends of the ring when means are applied to the projecting end of said rotating member.

3. The combination of a fixed vehicle wheel rim of channel form, a removable rim adapted to be applied to the wheel laterally and to lie across the channel of the fixed rim and to rest upon the edges of the sides thereof and formed with an inward extending projection, an expansible divided locking ring arranged in the channel of the fixed rim and bearing against one of the sides thereof, and bearing also against the said inward projection of the removable rim, one of the bearing faces of the locking ring being inclined, whereby it operates, when expanded, with a wedging action to force the removable rim laterally to its seat on the fixed rim, and cam means for expanding the locking ring.

4. In a demountable rim, the combination of a fixed rim having an outer inclined bearing edge, a removable rim having an inclined inner bearing surface adapted to engage the fixed rim, an expansible ring between the rims and having contiguous free ends between which and the main portion of the ring are thin resilient integral connections, and means between said ends for separating the latter and causing the ring to expand.

5. The combination of a fixed vehicle wheel rim, having an incline, a removable rim having a corresponding inclined inner face, an expansible ring between the rims having contiguous resilient ends and constructed to exert a lateral wedging action upon the removable rim to force it to its seat on the fixed rim when the ring is expanded, and means between said ends for separating the latter and causing the ring to expand.

6. In a demountable rim, the combination of a fixed rim, a removable rim, an expansible divided ring located between the rims and having resilient ends, and means between said ends for separating the latter, said means comprising a single rotatable cam bolt acting directly upon the resilient ends of the expansible rim.

7. In a demountable rim, the combination with the fixed rim, of a removable rim, an expansible divided ring located between the rims, and means between the ends of the divided ring for forcing the latter apart, said means including a single rotatable bolt, and a cam member thereon which is adapted to act against the ends of the ring.

8. In a demountable rim, the combination with the fixed rim, of a removable rim, an expansible divided ring located between the rims, and means between the ends of the divided ring for separating the latter, said means including a single rotatable bolt, and a cam member thereon which is adapted to act against the ends of the ring, said bolt being supported revolubly in the fixed rim and having a projecting end thereof adapted for the application of a tool for revolving said bolt.

9. In a demountable rim, the combination of a fixed rim, a removable rim, an expansible divided ring located between the rims and having resilient ends, means on the fixed rim at a point opposite to the ends of the ring for keeping said ring in position while it is being adjusted, and means between the ends of the divided ring consisting of a cam device for separating the latter and causing the said ring to expand and lock the parts together.

10. In a demountable rim, the combination of a fixed rim, a removable rim, an expansible divided ring located between the rims and having resilient ends, means consisting of a dowel carried by the fixed rim and loosely engaging said ring at a point opposite to the ends of the ring for keeping said ring in position while it is being adjusted, and means between the ends of the divided ring consisting of a cam device for separating the latter and causing the said ring to expand and lock the parts together.

11. In a demountable rim, the combination of the main body of the wheel, a removable rim surrounding the same, and having an inclined face adapted to ride upon a correspondingly-inclined face on the body of the wheel, a single expansible ring between the body of the wheel and the removable rim, said ring having resilient bent ends, a cam between said ends, and means for rotating the cam so that the ends may be separated and the ring expanded.

12. In a demountable rim, the combination of a fixed rim, a removable rim, said members having inclined faces corresponding to each other so that the removable rim may be mounted laterally upon the fixed rim, and said fixed rim having guiding means, a split ring arranged between the fixed rim and the removable rim, and kept in place by the aforesaid guiding means, and means for expanding said ring consisting of a single transverse rotating member which causes a separation of the ends of the ring when means are applied to the projecting end of said rotating member.

13. The combination with a fixed vehicle wheel rim, of a removable-tire-carrying rim, an expansible divided ring located between and bearing against both the said rims and having yielding resilient ends and arranged when expanded to force the removable rim laterally to its seat on the fixed rim, a rotatable cam member between the ends of the divided ring for expanding the latter, the cam member being recessed, and a spring bolt located in the recess in the cam member arranged to engage with the fixed rim for holding the cam in working position.

14. In a demountable rim, the combination of a fixed rim of channel form having parallel sides, a removable rim having an inclined inner face adapted to slide laterally upon the fixed rim and be clamped thereto, an expansible divided clamping ring located within the fixed rim, and means for expanding said divided ring, which means is journaled in the opposite sides of the fixed rim and consists essentially of a rotating cam member.

15. In a demountable rim, the combination of a fixed rim of channel form having parallel sides, a removable rim having an inclined inner face adapted to slide laterally upon the fixed rim and be clamped thereto, an expansible divided clamping ring located within the fixed rim, and means for expanding said divided ring, which means is journaled in the opposite sides of the fixed rim and consists of a single transverse rotating cam member which causes the separation of the ends of the ring when means are applied to the projecting end of said rotating member, means on the fixed rim at a point opposite to the divided ends of the ring for loosely engaging the ring and holding it in position when being adjusted.

In testimony whereof I hereunto affix my signature.

WILLIAM J. P. MOORE.